(12) United States Patent
Bartos

(10) Patent No.: US 9,080,691 B2
(45) Date of Patent: Jul. 14, 2015

(54) PIPE SECURING APPARATUS

(71) Applicant: Tomas Bartos, Wood Dale, IL (US)

(72) Inventor: Tomas Bartos, Wood Dale, IL (US)

(73) Assignee: AT WATER PLUMBING CO., Franklin Park, IL (US)

( * ) Notice: Subject to any disclaimer, the term of this patent is extended or adjusted under 35 U.S.C. 154(b) by 92 days.

(21) Appl. No.: 14/022,338

(22) Filed: Sep. 10, 2013

(65) Prior Publication Data

US 2015/0069190 A1  Mar. 12, 2015

(51) Int. Cl.
*F16L 5/00* (2006.01)
*F16L 3/04* (2006.01)

(52) U.S. Cl.
CPC .... *F16L 5/00* (2013.01); *F16L 3/04* (2013.01)

(58) Field of Classification Search
USPC ........... 248/72, 73, 74.1, 74.2, 74.3, 74.4, 65, 248/68.1, 58, 62, 63, 49, 56, 57
See application file for complete search history.

(56) References Cited

U.S. PATENT DOCUMENTS

| 3,036,801 | A | * | 5/1962 | Cemashko | 248/72 |
| 4,538,782 | A | * | 9/1985 | Kirschenbaum | 248/68.1 |
| 5,184,792 | A | * | 2/1993 | Bernhard et al. | 248/71 |
| 6,250,847 | B1 | * | 6/2001 | Bingham, Jr. | 405/184.4 |
| 6,622,976 | B1 | * | 9/2003 | Ianello | 248/73 |
| 6,802,483 | B1 | * | 10/2004 | Leasure | 248/229.15 |
| 7,549,613 | B1 | * | 6/2009 | Ismert et al. | 248/73 |
| 2004/0253057 | A1 | * | 12/2004 | Tsuchiya et al. | 405/183.5 |
| 2010/0116359 | A1 | * | 5/2010 | Ball et al. | 137/360 |

* cited by examiner

*Primary Examiner* — Steven Marsh
(74) *Attorney, Agent, or Firm* — Justin Lampel

(57) ABSTRACT

A device for securing a pipe within the interior of a wall is provided. The device is especially suitable for quickly and easily securing a pipe within an opening in a stud of a wall. The device has a generally flat surface which adheres to the front of a stud and a grasping portion which secures the pipe on a first end. The device allows the pipe to be secured within a wall in compliance with governmental regulations.

20 Claims, 6 Drawing Sheets

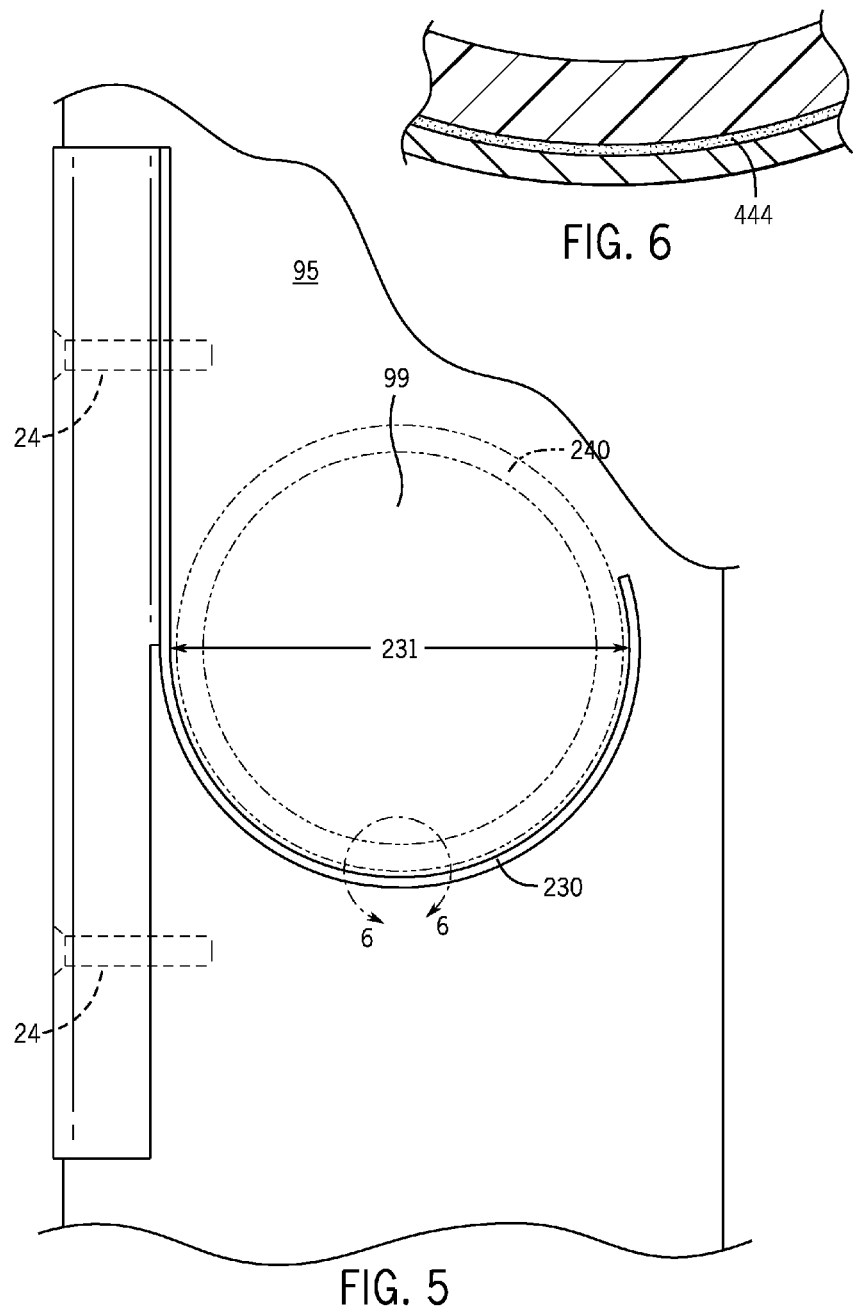

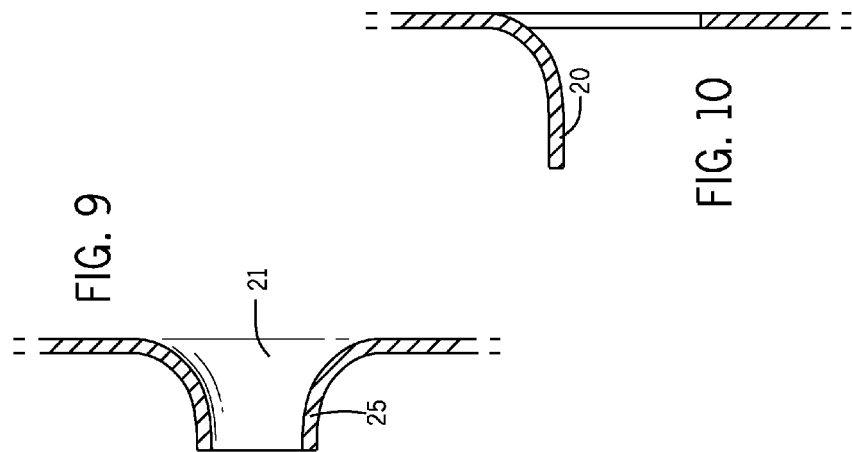
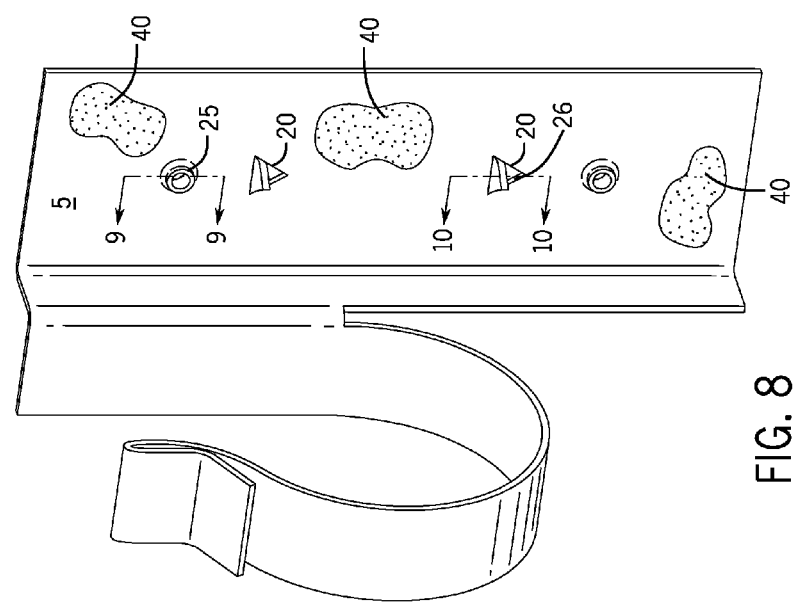

PIPE SECURING APPARATUS

BACKGROUND OF THE INVENTION

A device for securing a pipe within the interior of a wall is provided. The device is especially suitable for quickly and easily securing a pipe within an opening in a stud of a wall. The device has a generally flat surface which adheres to the front of a stud and a grasping portion which secures the pipe on a first end. The device allows the pipe to be secured within a wall in compliance with governmental regulations.

Attempts have been made to provide a pipe securing apparatus to secure a pipe within a wall of a building. For example, U.S. Pat. No. 6,241,199 to Ismert discloses a protective insulating sleeve having a two part construction with a pair of mating semi-cylindrical halves. Each semi-cylindrical half includes a semi-cylindrical metal sleeve surrounded by a semi-cylindrical plastic sleeve. The semi-cylindrical plastic sleeve has a groove formed in one exposed surface thereof and extending lengthwise along it. The semi-cylindrical metal sleeve extends outward past the semi-cylindrical plastic sleeve to form a tongue which mates with the groove in the other mating semi-cylindrical half such that the mated halves can be inserted into a bore in a stud or joist to receive a pipe or conduit extending through that stud or joist. Cushioning ribs are provided to dampen noise emanating from the pipe or conduit. The interlocked protective insulating sleeve thus serves the plural function of supporting and insulating the pipe or conduit and surrounding it with the metal sleeve to protect it from penetration by nails, screws or other fasteners driven into the stud or joist. The two part construction allows the protective insulating sleeve to be installed in a stud or joist before or after the pipe or conduit has been installed.

Further, U.S. Pat. No. 5,488,198 to Kramer discloses a new device for protecting wires and tubes which are placed thru the apertures in building panels or studs made of steel or the like. The protection device disclosed herein includes a single piece, plastic body having a wall surface which is bowed on opposing sides and flanged along its periphery. On opposing sides of the outer surface of the body's wall is arranged a single protruding ridge or a plurality of protruding, angled pins or male nubs which securely hold, in the gap formed between the wall flange and the ridge/male nubs, the opposing rims of an aperture in a metal stud that this device is designed to be securely attached to. The body of this device can be of any size or shape, including but not limited to square, rectangular, oval or cathedral shaped. Due to its elasticity and larger than aperture size, this device can be pinched in along the opposing bowed sides of the body's wall and upon release an outward pressure is achieved against the rims of the stud aperture. The design of the protruding male nubs in relation to the wall flange allows this device to remain firmly attached to the aperture once it is attached thereto.

Further, U.S. Pat. No. 8,424,267 to Cannistraro, et al. discloses an improved protective device for use with a metal stud. This invention protects in-wall piping, conduit and wiring from inadvertent puncturing by drywall screws during the installation of wall boarding.

However, these devices for securing a pipe within the interior of a wall fail to provide device for securing a pipe within a wall which is easy to use, quick and inexpensive. Further, these devices fail to provide a pipe securing apparatus which easily complies with governmental regulations.

SUMMARY OF THE INVENTION

A device for securing a pipe within the interior of a wall is provided. The device is especially suitable for quickly and easily securing a pipe within an opening in a stud of a wall. The device has a generally flat surface which adheres to the front of a stud and a grasping portion which secures the pipe on a first end. The device allows the pipe to be secured within a wall in compliance with governmental regulations.

An advantage of the present device is that the present device is easily secured to a stud of a wall.

Still a further advantage of the device is that the present device is light-weight and easy to install.

Yet another advantage of the present device is that the present device may be constructed from a single unit with no moving parts.

And yet another advantage of the present device is that the present device may be used to secure pipes of various sizes.

Yet another advantage of the present pipe securing apparatus is that the present device may be used without inhibiting the installation of drywall over a stud.

A further advantage of the present device is that the present device may secure a pipe within a stud with a single or a few nails/screws.

Yet another advantage of the present device is that the present device may allow for easy compliance with governmental regulations.

For a more complete understanding of the above listed features and advantages of the present pipe securing device reference should be made to the following detailed description of the preferred embodiments. Further, additional features and advantages of the invention are described in, and will be apparent from, the detailed description of the preferred embodiments.

BRIEF DESCRIPTION OF THE DRAWINGS

FIG. 5 illustrates a side view of an embodiment of the support unit of device.

FIG. 6 illustrates a close up of the support unit securing a pipe.

FIG. 8 illustrates a view of the back of the pipe securing apparatus.

FIG. 9 illustrates a side view of the extended lip of the pipe securing apparatus.

FIG. 10 illustrates a side view of the protrusion of the pipe securing apparatus.

DETAILED DESCRIPTION OF THE PREFERRED EMBODIMENTS

A device for securing a pipe within the interior of a wall is provided. The device is especially suitable for quickly and easily securing a pipe within an opening in a stud of a wall. The device has a generally flat surface which adheres to the front of a stud and a grasping portion which secures the pipe on a first end. The device allows the pipe to be secured within a wall in compliance with governmental regulations.

Figure 1:
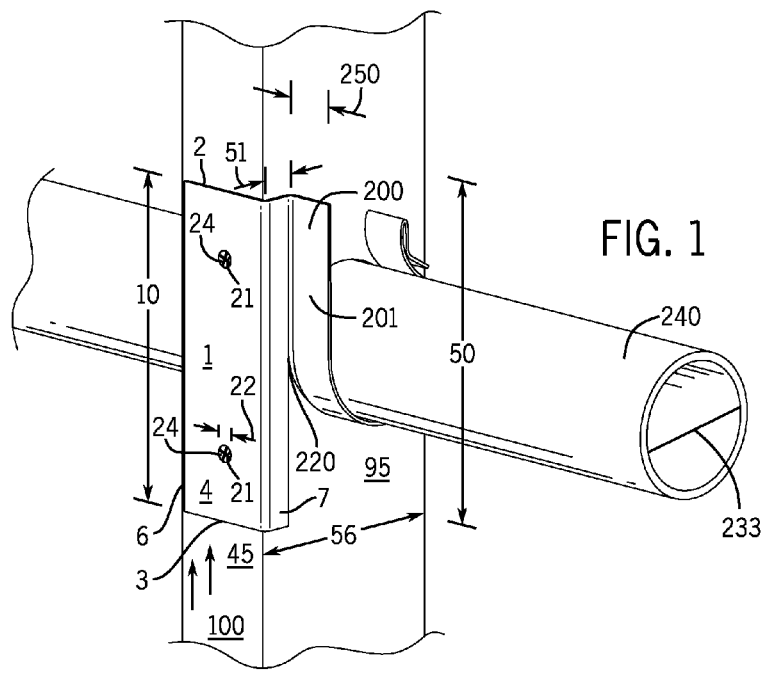
FIG. 1 illustrates a front perspective view of the pipe securing apparatus which secures a pipe within a stud of a wall.

Referring now to the drawings, FIG. 1 illustrates a pipe securing device 1. The pipe securing device 1 is preferably constructed of a single unit of lightweight metal. It should be understood that the device 1 may be made of any suitable material.

Figure 3:
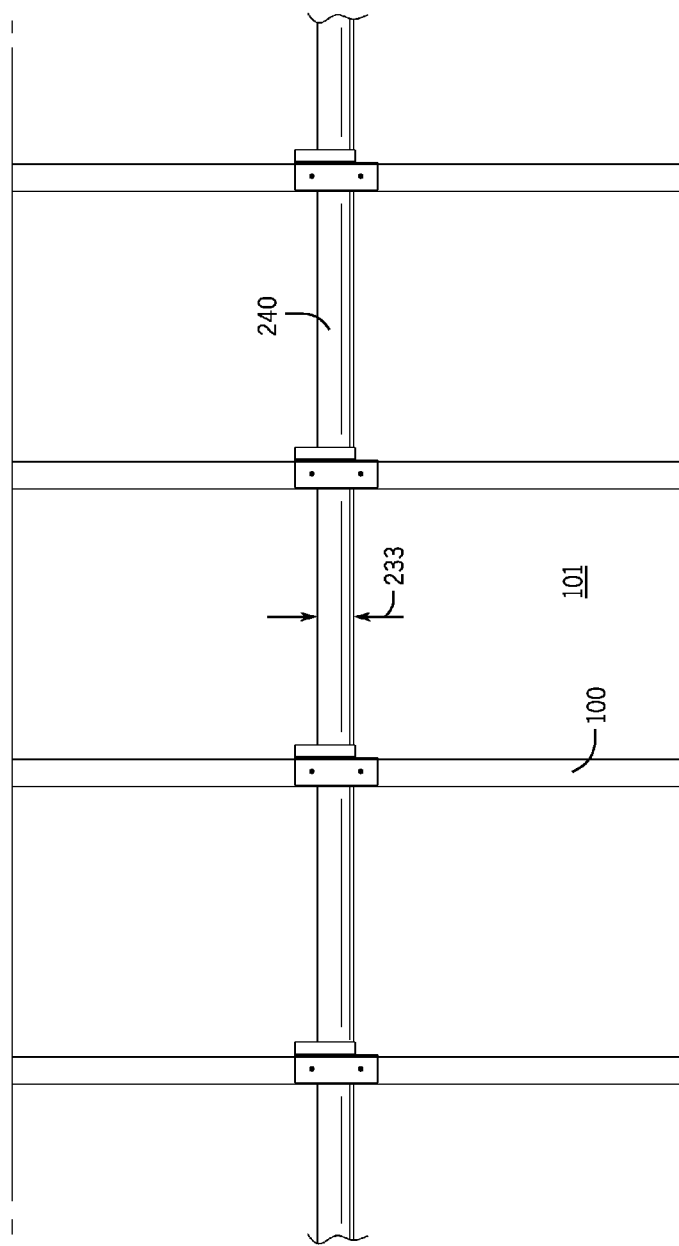
FIG. 3 illustrates a view of multiple pipe securing apparatus used in a wall to secure a pipe.
Figure 7:
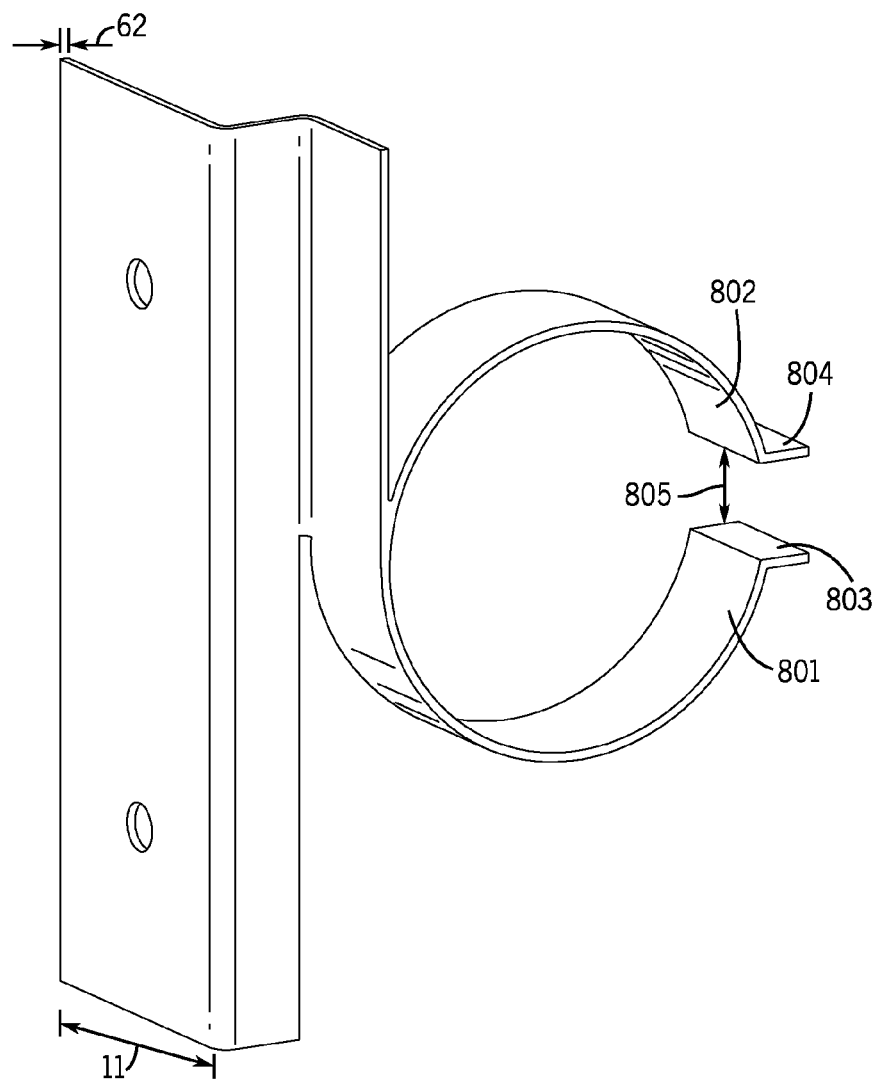
FIG. 7 illustrates a perspective view of the device wherein the device has two clamps.

The device 1 may have a top 2, a bottom 3, a front 4, a back 5 (FIG. 8), a first side 6 and a second side 7. The front 4 of the device 1 may be, for example, generally rectangular having a length 10, a width 11 (FIG. 7) and a depth 62 (FIG. 7). In an embodiment, the depth 62 of the device 1 is generally very thin so as to allow drywall to be placed over and secured to a stud 100 without the device 1 interfering with securing the drywall to the stud 100. In an embodiment, the width 62 is less than 1 mm. Preferably the width 11 of the device 1 covers approximately at least one half or more of the width of a stud 100 of a wall 101 (FIG. 3). The front 4 of the device 1 may have at least one opening 21. FIG. 1 illustrates the front 4 of the device 1 having two openings 21; however, the front 4 of the device 1 may have any number of openings 21 so as to suit the desired functions. In an embodiment, the back 5 of the device 1 may have an adhesive 40 (FIG. 8) which may further help secure the device 1 to a stud 100 of the wall 101.

In an embodiment, the openings 21 of the front 4 of the device 1 may be located near the top 2 and near the bottom 3 of the device 1 such that the screws or nails 24 inserted into the openings 21 will not strike and damage the pipe 240. More specifically, the openings 21 may not be located in the area for which the pipe 240 will rest directly behind the back 5 of the device 1.

In an embodiment, the back 5 of the device 1 may have at least one protrusion 20 (FIG. 8). In an embodiment, the protrusion 20 is a triangular spike which is partially cut out and bent back from the front 4 of the device 1. In the embodiment with the protrusion 20, the protrusion 20 may point downward (toward the bottom 3 of the device 1). As a result, the device 1 may slide easily up along the front surface 45 (FIG. 1) of the stud 100 but may offer resistance in moving down the stud 100. When the device 1 is secured in the proper position, the protrusion 20 may be partially inserted and may dig into the interior of the stud 100 similar to a nail so that the device 1 does not move (once inserted) with respect to the stud 100. In an embodiment, the protrusions 20 may be used instead of a nail or screw 24. More specifically, the protrusion 20 may act as the main securing mechanism to secure the device 1 to the stud 100. The openings 26 (FIG. 8) of the protrusions 20 may also be used to visually examine a portion of the stud 100 behind the device 1 so as a user may align the opening 26 of the protrusions 20 with predetermined marks 27 (FIG. 2) already located on the front 45 of the stud 100 so as to properly position the device 1 for use.

In an embodiment, the openings 21 have a diameter 22 which is slightly larger than the diameter 23 of a standard screw or nail 24 so that the screw or nail 24 snuggly fits into the opening 21. Further, in an embodiment, the opening 21 may have a recessed lip portion 25 (FIG. 8) which extends toward the back 5 of the device 1 therein increasing surface area for the device 1 to contact the screw or nail 24 and to further provide additional surface area to contact the stud 100 of the wall 101.

The second side 7 of the device 1 may be attached to the front 4 of the device 1. More specifically, the second side 7 may extend back (away from the front 4). The second side 7 may be generally rectangular having a length 50 substantially similar to the length 10 of the front 4. The second side 7 may further have a width 51 which may be substantially less than the width 11 of the front 4. More specifically, the width 51 of the second side 7 may cover approximately one tenth to one fifth a depth 56 of the stud 100. The second side 7 may extend from the front 4 in a generally perpendicular manner with respect to the front 4.

In an embodiment, secured to the second side 7 of the device 1 may be a support unit 200. The support unit 200 may have a front surface 201 which is substantially perpendicular to the second side 7 and substantially parallel with respect to the front 4 of the device 1. In an embodiment, the front surface 201 of the support unit 200 may extend from the top 2 of the device 1 to approximately thirty to seventy percent of the bottom 3 of the device 1. In an embodiment, the support unit 200 may have a first end 275 and a second end wherein the second end is secured to the second side 7 of the device 1 and wherein the first end 275 of the support unit 200 is not secured to the second side 7 of the device 1.

Figure 2:
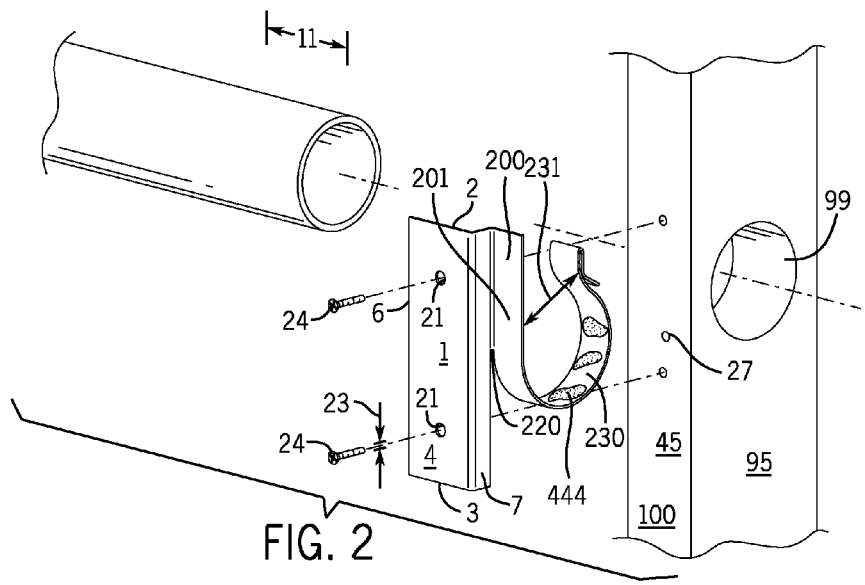
FIG. 2 illustrates a view of the pipe securing apparatus being inserted onto a stud.

In an embodiment, the front surface 201 of the support unit 200 may be substantially flat. Extending from the point wherein the support unit 200 is no longer in contact with the second side 7 (at connection point 220) may be a generally curved portion 230 (FIG. 2). In an embodiment, the generally curved portion 230 may be generally semi-circular having a diameter 231 (FIG. 5). The diameter 231 of the generally curved portion 230 may be slightly greater than a diameter 233 of a pipe 240 which is ultimately secured by the device 1.

In an embodiment, the support unit 200 may have a width 250. The width 250 of the support unit 200 may be approximately one third the width 11 of the front 4 of the device 1. The width 250 of the support unit 200 may be altered depending on the desired use of the device 1. More specifically, if a larger or heavier pipe 240 is used, the width 250 of the support unit 200 may be increased.

In an embodiment (FIG. 5), the generally curved portion 230 of the support unit 200 may end at slightly greater than one hundred and eighty degrees with respect to the connection point 220 so that the pipe 240 may be easily placed in the half-circle created by the generally curved portion 230 without the need to alter the generally curved portion 230. The width 250 of the generally curved portion 230 may be the contact point and support for the pipe 240. The pipe 240 may be held in place by friction and gravity. In an embodiment, an adhesive 444 may be located on the upper side of the generally curved portion 230 to further secure the pipe 240.

Figure 4:
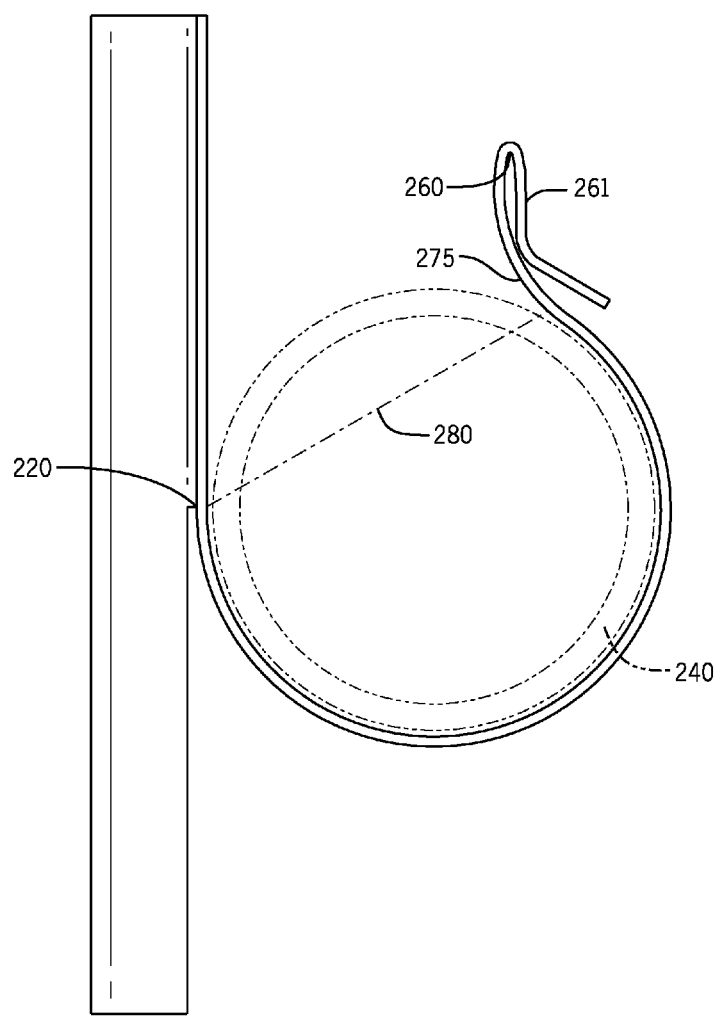
FIG. 4 illustrates a side view of an embodiment of the support unit of the device.

Referring now to FIG. 4, in an embodiment, the generally curved portion 230 may extend greater than half-way (greater than one hundred and eighty degrees) around the pipe 240. More specifically, in this embodiment, the generally curved portion 230 may have a first end 275. The distance 280 between the first end 275 and the connection point 220 may be less than the diameter 233 of the pipe 240 such that the first end 275 must be temporarily bend away from the connection point 220 to insert the pipe 240 onto the upper surface of the generally curved portion 230. The first end 275 may then spring back (through elastic tension) to cover a portion of the pipe 240 once the pipe 240 is inserted in the device 1. As a result, the pipe 240 is less likely to accidently move as a result of being secured on greater than one hundred and eighty degrees with respect to the circumference of the pipe 240.

In an embodiment, the first end 275 of the generally curved portion 230 may have an extended lip portion 260. The extended lip portion 260 may be generally rectangular and substantially flat. Further, in an embodiment, the extended lip portion 260 may be substantially parallel with respect to the support unit 200. The extended lip portion 260 may have a folded back portion 261 which folds away from the support unit 200. The folded back portion 261 may reduce sharp edges and therein reduce injury and may further provide a thicker surface to grasp the first end 275 of the device 1 so as to allow the user to pull the first end 275 away from the back of the support unit 200 so as to place the pipe 240 in the device 1. In an embodiment, the extended lip portion 260 moves from a first position to a second position wherein in the first position the extended lip portion 260 is in a relaxed position and wherein in the second position the support unit 200 has increased spring tension and wherein the extended lip portion 260 returns to the relaxed first position (closer to the front 4) when no force is acted upon it.

Referring now to FIG. 7, in an embodiment, the device 1 may have a first clamp portion 801 and a second clamp portion 802. A first tab 803 may be secured to the end of the first clamp portion 801 and a second tab 804 may be secured to the second clamp portion 802. A distance 805 may separate the first tab 803 from the second tab 804. In this embodiment, a user applies force to pull the first tab 803 away from the second tab 804; therein increasing the distance 805 between the two tabs 803, 804. A user then inserts the pipe 240 and then releases the spring pressure (created by the clamps) allowing the first tab 803 and second tab 804 to return to the original orientation (therein returning the distance 805 to the original distance). The first clamp portion 801 and second clamp portion 802 may therein secure the pipe 240.

To use the device 1, a user first slides the device 1 upward along a stud 100. More specifically, the back 5 of the device 1 slides up along the front surface 45 of the stud 100. The second side 7 of the device 1 slides up the stud 100 flush with the side 95 of the stud 100. The user slides the device 1 upward (or optionally downward if the device 1 lacks the protrusions 20 as stated above) until the bottom surface of the generally curved portion 230 of the device 1 substantially aligns with an opening 99 extending through the side 95 (FIG. 1) of the stud 100. When the pipe 240 is secured through the opening 99, the bottom surface of the generally curved portion 230 of the device 1 contacts and helps support the pipe 240 within the wall.

Once the device 1 is in place and supports the pipes 240 in the wall 101, the user may then insert the nail, screw 24 or the like into the openings 21 on the front 4 of the device 1. As a result, the device 1 is secured to the stud 100 and is prevented from moving. After properly securing a pipe 240 to the stud 100 by use of the device 1, the user may repeat the process by inserting additional devices 1 along the length of the wall 101 at every stud 100 (at approximately the same distance from the floor so as the pipes 240 remain level). As a result, the pipe 240 may be used within the wall at every location wherein the pipe 240 passes through a stud 100.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A pipe securing apparatus comprising:
   a generally rectangular brace having a front having a length, a back, a first side, a second side, a top, and a bottom wherein the back of the generally rectangular brace is secured to a stud of a wall;
   a rectangular panel extending from the first or second side of the generally rectangular brace wherein the rectangular panel is at a right angle with respect to the generally rectangular brace;
   an extended support unit secured at a right angle to the opposing side of the rectangular panel as the generally rectangular brace wherein the extended support unit has a length less than the length of the generally rectangular brace and wherein the extended support unit has a generally rectangular front portion and a generally curved bottom end;
   wherein the front of the extended support unit is parallel to the front of the generally rectangular brace; and
   wherein the generally curved bottom end of the extended support unit is arraigned to partially secure a pipe wherein the pipe runs substantially parallel with the front of the generally rectangular brace and wherein the pipe passes through an opening in the stud of the wall.

2. The pipe securing apparatus of claim 1 further comprising:
   an opening on the front of the generally rectangular brace wherein the opening receives a nail or screw and wherein the nail or screw secures the generally rectangular brace to the stud of the wall.

3. The pipe securing apparatus of claim 2 further comprising:
   an extended lip portion surrounding the opening of the front of the generally rectangular brace wherein the extended lip portion extends away from the front of the generally rectangular brace and wherein the extended lip portion increases the surface area of the opening so as to further secure a screw or nail to the stud of the wall.

4. The pipe securing apparatus of claim 2 wherein the opening on the front of the generally rectangular brace occupies a location not directly in front of the pipe passing through the wall.

5. The pipe securing apparatus of claim 1 further comprising:
   an adhesive on a top surface of the generally curved bottom end of the support unit wherein the adhesive secures the pipe to the generally curved bottom end of the extended support unit.

6. The pipe securing apparatus of claim 1 further comprising:
   a first end and a second end of the extended support unit wherein the second end is secured to the generally rectangular panel and wherein the first end of the extended support unit is not secured to the generally rectangular panel.

7. The pipe securing apparatus of claim 6 further comprising:
   an extended tab on the first end of the extended support unit wherein the extended tab is located at a distance less than a distance of a diameter of the pipe secured on the device.

8. The pipe securing apparatus of claim 7 wherein the extended tab moves from a first position to a second position and wherein the first position the extended tab is in a relaxed state and wherein in the second position the extended tab has increased spring tension and wherein the extended tab returns to the relaxed first position when tension is released.

9. The pipe securing apparatus of claim 7 further comprising:
   a folded back portion of the extended tab on the first end of the support unit.

10. The pipe securing apparatus of claim 1 further comprising:
    a protrusion located on the back of the generally rectangular brace wherein the protrusion is triangular in shape and wherein the protrusion is inserted into the stud of the wall and wherein the protrusion secures the generally rectangular brace to the stud.

11. The pipe securing apparatus of claim 1 further comprising:

an adhesive located on the back of the generally rectangular brace wherein the adhesive secures the generally rectangular brace to the stud of the wall.

12. A pipe securing apparatus comprising:
- a generally rectangular brace having a front having a length, a back, a first side, a second side, a top, and a bottom wherein the back of the generally rectangular brace is secured to a stud of a wall;
- a rectangular panel extending from the first or second side of the generally rectangular brace wherein the rectangular panel is at a right angle with respect to the generally rectangular brace; and
- a extended support unit secured at a right angle to the opposing side of the rectangular panel as the generally rectangular brace wherein the extended support unit is parallel to the generally rectangular brace and wherein the extended support unit has a curved top end and a curved bottom end together forming a circle having an opening in the center for receiving a pipe and an opening along the circumference for sliding the pipe into the opening of the center of the extended support unit.

13. The pipe securing apparatus of claim 12 further comprising:
- an opening on the front of the generally rectangular brace wherein the opening receives a nail or screw and wherein the nail or screw secures the generally rectangular brace to the stud of the wall.

14. The pipe securing apparatus of claim 13 further comprising:
- an extended lip portion surrounding the opening of the front of the generally rectangular brace wherein the extended lip portion extends away from the front of the generally rectangular brace and wherein the extended lip portion increases the surface area of the opening so as to further secure the screw or nail to the stud of the wall.

15. The pipe securing apparatus of claim 12 wherein the opening on the front of the generally rectangular brace occupies a location not directly in front of the pipe.

16. The pipe securing apparatus of claim 12 further comprising:
- an adhesive on a top surface of the generally curved bottom of the second extend support unit wherein the adhesive secures the pipe to the generally curved bottom end of the second extended support unit.

17. The pipe securing apparatus of claim 12 further comprising:
- a first end and a second end of the first and second extended support units wherein the second end of the first and second extended support units are secured to the second side of the generally rectangular panel and wherein the first ends of the first and second extended support units are not secured to the generally rectangular panel.

18. The pipe securing apparatus of claim 14 further comprising:
- an extended tab on the first end of the first extended support unit;
- an extended tab of the first end of the second extended support unit; and
- wherein the extended tabs of the first and second extended units are located at a distance from each other less than a distance of a circumference of the pipe secured on the device.

19. The pipe securing apparatus of claim 18 wherein the extended tab moves from a first position to a second position and wherein the first position is a relaxed position and wherein the second position has increased spring tension.

20. The pipe securing apparatus of claim 12 further comprising:
- a protrusion located on the back of the generally rectangular brace wherein the protrusion is triangular shaped and wherein the protrusion is inserted into the stud of the wall and wherein the protrusion secures the generally rectangular brace to the stud.

* * * * *